United States Patent [19]
Nakamura et al.

[11] Patent Number: 5,432,646
[45] Date of Patent: Jul. 11, 1995

[54] APPARATUS FOR RECORDING VIDEO SIGNALS AND INDEX SIGNALS ON TRACKS OF A MAGNETIC TAPE

[75] Inventors: Akihiko Nakamura, Osaka; Haruo Isaka, Yawata; Makoto Gotou, Nishinomiya, all of Japan

[73] Assignee: Matsushita Electric Industrial Co., Ltd., Osaka, Japan

[21] Appl. No.: 250,655

[22] Filed: May 27, 1994

Related U.S. Application Data

[63] Continuation of Ser. No. 913,959, Jul. 17, 1992, abandoned.

[30] Foreign Application Priority Data

Jul. 18, 1991 [JP] Japan .................................. 3-178004
Nov. 8, 1991 [JP] Japan .................................. 3-292787

[51] Int. Cl.⁶ ............................................. G11B 5/02
[52] U.S. Cl. ........................................ 360/18; 360/22; 360/14.1; 360/19.1
[58] Field of Search ............... 360/19.1, 18, 13, 14.1, 360/14.2, 14.3, 22, 72.2, 77.15, 10.3

[56] References Cited

U.S. PATENT DOCUMENTS

| | | | |
|---|---|---|---|
| 4,287,539 | 9/1981 | Bixby et al. | 360/18 |
| 4,587,577 | 5/1986 | Tsunoda | 360/18 X |
| 4,760,475 | 7/1988 | Wong et al. | 360/18 |
| 4,914,527 | 4/1990 | Asai et al. | 360/10.3 |
| 4,951,162 | 8/1990 | Yoshimura et al. | 360/18 X |

*Primary Examiner*—Andrew L. Sniezek
*Attorney, Agent, or Firm*—Wenderoth, Lind & Ponack

[57] ABSTRACT

A magnetic recording and reproducing apparatus records video signals divided into plural segments in every specific group, and also records index signals accompanying the video signals in different areas on a magnetic tape having oblique tracks. The apparatus also records the time code of at least the video signal as the index signal, and records the same time code in the index areas of at least three continuous plural tracks. The index area for recording the time code is divided into a plurality of small areas in one track, and the same time code is recorded in each small region. The leader code is recorded in the index area for recording at least the time code.

6 Claims, 6 Drawing Sheets

FIG. 9(a) INTERNAL FIXED CLOCK

FIG. 9(b) POSITIONING SIGNAL

FIG. 9(c) INDEX EDITING TIMING SIGNAL

FIG. 9(d) TRACK POSITION

APPARATUS FOR RECORDING VIDEO SIGNALS AND INDEX SIGNALS ON TRACKS OF A MAGNETIC TAPE

This application is a continuation of now abandoned application Ser. No. 07/913,959, filed Jul. 17, 1992.

BACKGROUND OF THE INVENTION

1. Field of the Invention

The present invention relates to a magnetic recording and reproducing apparatus for recording information such as video, sound and data on a magnetic tape, and for reproducing the recorded information, and more particularly a magnetic recording and reproducing apparatus including index information for editing the recorded information. Editing is the function for rewriting a specific recording area, erasing a specific recording area, continuous additional recording after a specific recording area, and other changes of the recorded data.

2. Description of the Prior Art

The magnetic recording and reproducing apparatus using a magnetic tape as a recording medium, such as the video tape recorder (hereinafter called a VCR), has been developed and widely used. Furthermore, much higher density technologies, digital signal processing technologies and down-sizing of the apparatus have progressed. Usually, when recording information signals, an index signal is also recorded. The index signal is the leader code for showing the recording start position of data, an absolute time code showing the absolute position on the magnetic tape, a user time ode determined by the user, a title showing the content of information, and the like. Examples of recording such index signals include a DAT (digital audio tape) recorder and an 8 mm VCR. In the standard of the DAT or 8 mm VCR, as is widely known, it is possible to edit so as to rerecord only the index while preserving the recorded video signals or audio signals. It is, however, not possible to edit so as to record only one of the items (for example, leader code, absolute time code, or user time code) while information about plural items (leader code, absolute time code, timer time code, etc.) is recorded in the index region of one track.

SUMMARY OF THE INVENTION

It is hence a primary object of the invention to present a magnetic recording and reproducing apparatus capable of editing every item in the index containing plural items. To achieve the object, the invention presents a magnetic recording apparatus for recording video signals and index signals on oblique tracks each having a video signal recording area and an index area on a magnetic tape, comprising:

- a means for moving the magnetic tape;
- a video signal generating means for generating sa video signal;
- a clock signal generating means for generating a clock signal synchronized with the video signal;
- a segmenting means for dividing the video signal in each frame into a plurality of segments to obtain segmented video signals;
- an index signal generating means for generating index signals containing a time code; and
- a recording means including a rotary magnetic head, said recording means being responsive to the clock signal for alternately selecting and recording via the rotary magnetic head the segmented video signals and the index signals such that the segmented video signals in each frame and the index signals are recorded in video signal recording areas and index areas, respectively, of each of a set of continuous oblique tracks;
- wherein said index signal generating means generates a same time code repeatedly so that the same time code is recorded in the index signal recording area of each of at least three continuous oblique tracks among the set of continuous oblique tracks.

In this configuration, since the item of the index recorded in the index area in one track is the time code only, it is possible to change only the time code when editing. In addition, since the same time code is recorded in the index area of each of the continuous plural tracks, the tolerance to track maceration (reduction of track width) is strong even when the both adjacent tracks of the time code recorded track are rewritten by using a magnetic head broader than the track width.

Moreover, by arranging the configuration such that the index area recording the time code is divided into a plurality of small areas in one track, and the same time code is recorded in each small area, the length on the track in the synchronous unit is short when reproducing the index signal, and when the scanning trace of the rotary head crosses plural tracks as in a high speed search, successful index detection rate can be enhanced.

By further arranging the configuration such that the index generating means comprises a leader code generating means for generating a leader code, and a synthesizing means for synthesizing the leader code and time code, and the leader code is recorded at least in the time code recorded index area by recording the output of the synthesizing means in the index area, the time code can be rewritten while preserving the leader code, or the leader code can be rewritten while preserving the time code, and such editing can be done easily.

BRIEF DESCRIPTION OF THE DRAWINGS

FIG. 9 show time charts of signals in the insert editing mode in the embodiment of the present invention.

DESCRIPTION OF THE PREFERRED EMBODIMENT

Figure 1:
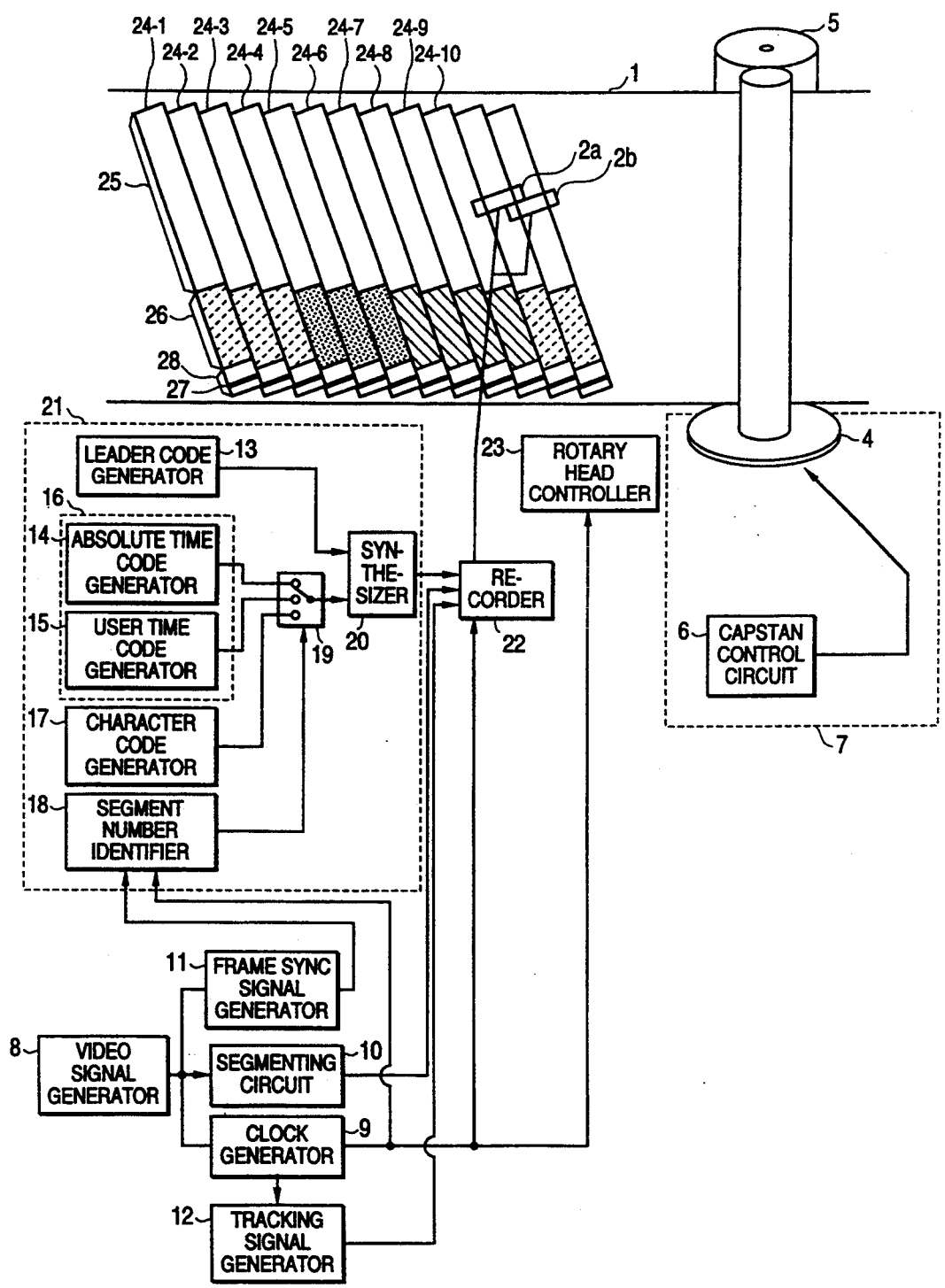
FIG. 1 is a diagram showing an operation in a recording mode of a magnetic recording arid reproducing apparatus in accordance with an embodiment of the present invention.
Figure 2:
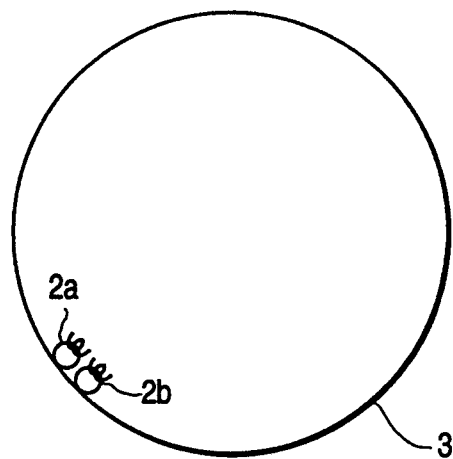
FIG. 2 is a layout diagram of rotary heads on a cylinder in the embodiment of the present invention.

FIG. 1 is a diagram showing the recording mode of a magnetic recording and reproducing apparatus in accordance with an embodiment of the present invention. In FIG. 1, element 1 is a magnetic tape; elements 2a and 2b are rotary heads mounted on a cylinder (not shown), and elements 24-1 to 24-10 are tracks formed on the magnetic tape 1. Element 7 is a tape running unit, comprising a capstan motor 4, a pinch roller 5, and a capstan control circuit 6. Element 8 is a video signal generator; element 9 is a clock generator; element 10 is a segmenting circuit; element 11 is a frame synchronous signal generator, and element 12 is a tracking signal generator. Element 21 is an index generator, comprising a leader code generator 13, a time code generator 16, a character code generator 17, a segment number identifier 18, a time code output unit 19, and a synthesizer 20. The time code generator 16 is composed of an absolute time code generator 14 and a user time code generator 15. Element 22 is a recorder and element 23 is a rotary head controller. This embodiment is an example of a system for recording and reproducing two tracks nearly simultaneously by using rotary heads 2a and 2b. FIG. 2 is a diagram showing the layout of the rotary heads on the cylinder in the same embodiment, in which element 3 is a cylinder.

Figure 3:
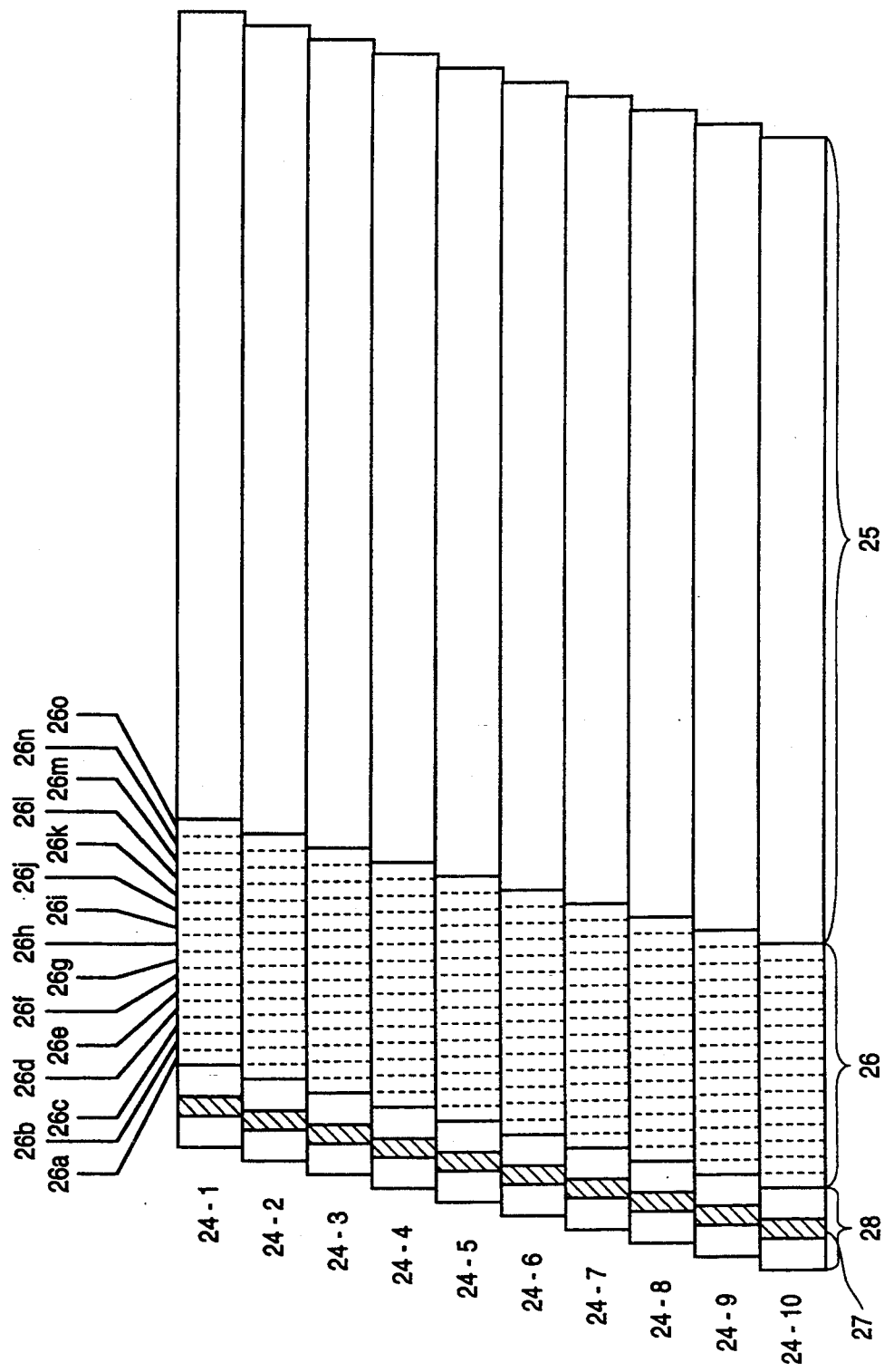
FIG. 3 is a composition diagram of recording tracks in accordance with the embodiment of the present invention.

FIG. 3 is a diagram showing the composition of each track shown in FIG. 1, in which a positioning signal area 27 is formed in a part of a tracking signal area 28 formed at the beginning of a track, and a positioning signal is recorded. For this positioning signal, a relatively high frequency is selected so as to be less influenced by adjacent tracks. Meanwhile, in the tracking signal area 28, a pilot signal for tracing is recorded in frequency multiplexing. This pilot signal is recorded alternately at two different frequencies f1 and f2 in every other track. For these two frequencies of the pilot signal, relatively low frequencies are selected so as to be less influenced by the azimuth loss of the rotary heads 2a and 2b. In a video signal area 25, video signals are recorded, while index signals are recorded in an index area 26.

The recording operation in FIG. 1 is explained. In the recording mode, the magnetic tape 1 is driven by the capstan motor 4 whose rotating speed is controlled by the capstan control circuit 6, and the pinch roller 5.

The video signal generator 8 creates signals corresponding to 30 frames per second (one frame corresponds to one television screen). The segmenting circuit 10 divides the signals of one frame into ten segments. Finally, the video signals of one frame are recorded as being divided into ten tracks. The segmented video signals are input to the recorder 22 together with segment numbers.

In the clock generator 9, a clock synchronized with the input video signal is produced. Here, video signals for 30 frames per second are input, and a 150 Hz clock synchronized with the video signal is produced.

The tracking signal generator 12 generates a tracking signal containing a pilot signal of two different frequencies f1 and f2 depending on the clock from the clock generator 9, and a positioning information signal. This tracking signal is input to the recorder 22.

The frame synchronous signal generator 11 generates a 30 Hz frame synchronous signal synchronized with the frame of the input video signals.

The leader code generator 13 generates a leader code for use mainly in a high speed search. More specifically it is a signal showing the recording start position of a program or the like. The leader code is input to the synthesizer 20.

The absolute time code generator 14 generates an absolute time code showing the absolute position on the tape. More specifically, it is a signal showing the recording time or the number of tracks from the start of the tape. The absolute time code is input to the time code output unit 19.

The user time code generator 15 generates a user time code added t a recorded program to be controlled by the user. More specifically, it is a signal showing the recorded date and time of the program. The user time code is input to the time code output unit 19.

The character code generator 17 generates a character code relating to a recorded program. More specifically, it is a signal showing the title of a program, or the name of the operator of a camera-recorder, or the like. The character code is input to the time code output unit 19.

the segment number identifier 18 recognizes the segment number (1 to 10) within one frame of segmented video signals input to the recorder 22, by the clock of the clock generator 9 and the frame synchronous signal of the frame synchronous signal generator 11, and inputs the segment number to the time code output unit 19.

The time code output unit 19 changes over the signal to be entered in the synthesizer 20 depending on the segment number of the segment number identifier 18. More specifically, the absolute time code is entered in the synthesizer 20 when the segment number is 1, 2 or 3, the user time code when the segment number is 4, 5 or 6, and the character code when the segment number is 7, 8, 9 or 10. However, in the outputs of the absolute time code and user time code, the same time code is entered in the synthesizer 20 regardless of the segment number.

The synthesizer 20 synthesizes the leader code and the output of the time code output unit 19. The signal after synthesis is input to the recorder 22 as an index signal. The index signal in the embodiment, therefore, contains the leader code in any segment number in one frame. The absolute time code, user time code and character code are contained in the index signal in continuous plural segment numbers.

The recorder 22 sends such a recording signal as to record the segmented video signal, index signal and tracking signal in each area separately depending on the clock output of the clock generator 9, to the rotary heads 2a and 2b.

The rotary head controller 23 controls the rotating speed of the cylinder 3 mounting the rotary heads 2a and 2b so as to be synchronized with the clock output of the clock generator 9.

Figure 4:
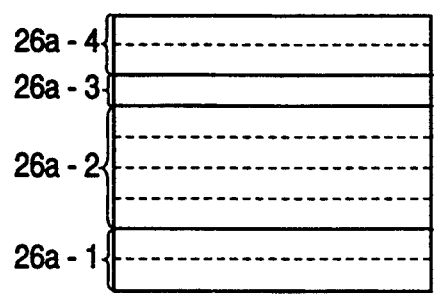
FIG. 4 is a detailed composition diagram in one synchronous unit of an index region in accordance with the embodiment of the present invention.

As a result of the above operation, tracks as shown in FIG. 3 are formed on the magnetic tape 1. Here, the index area 26 is divided into plural (fifteen in FIG. 3) small areas called synchronous units. Numerals 26a and 26o are synchronous units. In the track where the absolute time code or user time code is recorded, the same code is recorded in each synchronous unit of the index area in one track. A detailed configuration of one synchronous unit 26a in the index region 26 in FIG. 3 is shown in FIG. 4. Element 26a is a synchronous unit where the absolute time code and leader code are recorded. Element 26a-1 is a sync area, in which the signal showing the recording start position in the synchronous unit is recorded in 2 bytes. Element 26a-2 is an area for recording an absolute time code, which is recorded in 4 bytes. Element 26a-3 is a leader code recording area, which is 1 byte. Element 26a-4 is a parity area, in which a signal for detecting (and correcting) a signal reading error is recorded. This area is 2 bytes.

The composition is the same for one synchronous unit in the index area in which the user time code is recorded. That is, instead of the absolute time code, the user time code is recorded.

Thus, by recording the time code (absolute time code or user time code) and leader code which are simultaneously recorded in the video signal as index signals, they can be effectively utilized in detecting and retrieval at the time of editing or searching.

Figure 5:
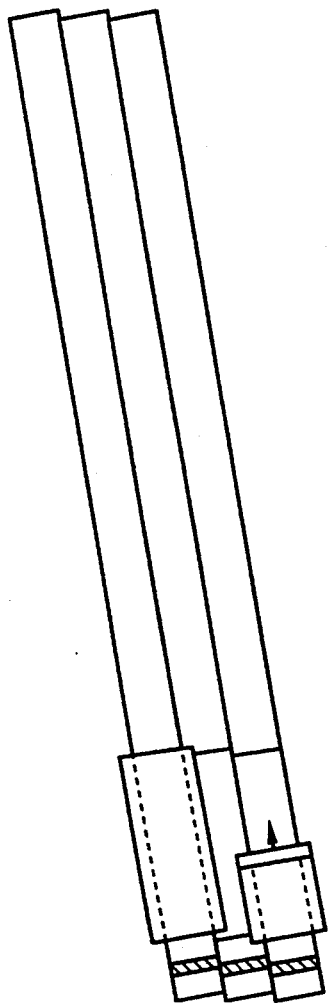
FIG. 5 is an example of mode of track maceration occurring during insert editing.
Figure 6:
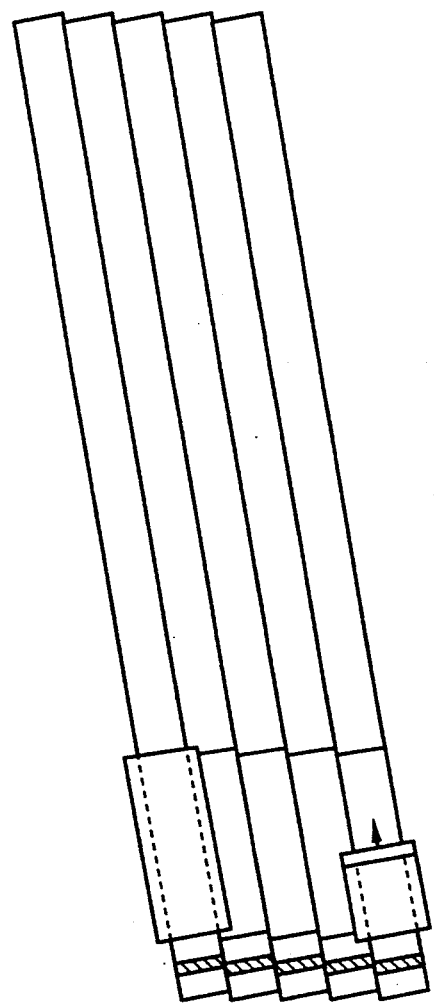
FIG. 6 is an example of mode of track maceration occurring during insert editing in the present invention.

In particular, as shown in the embodiment, by recording the same time code in the index area in three or more continuous tracks, the apparatus becomes very resistant to track maceration due to editing of adjacent tracks. For example, as for the absolute time code, adverse effects by track maceration caused at the time of rewriting the user time code or character code can be notably reduced. FIG. 5 is a diagram showing a mode of rewriting the index area of both adjacent tracks of a certain track. For example, when the absolute time code is recorded in one track only, and the insert editing of both its adjacent tracks is effected, the absolute time code recording track is macerated, or narrowed, on both sides f the track, and the reading error rate is high when reading the signal by the rotary heads, and the data reliability is significantly lowered. FIG. 6 shows the mode of track maceration when the index area of both adjacent tracks is rewritten when the same time code is recorded in three continuous tracks as in this embodiment. Both sides of the track are not macerated, and at least one track is preserved as is, so that the time code can be reproduced and detected without error. Thus, as in this embodiment, recording of the same absolute time code or user time code in three or more continuous tracks is very effective from the viewpoint of reliability of the time code after insert editing.

In the track where the time code is recorded, meanwhile, by recording the same code in each synchronous unit in the index area in that track, in the case of the canning trace of the rotary head as in the high speed search crossing plural tracks, it is enough to detect the time code from at least one synchronous unit, and the successful detection rate of the time code is notably enhanced.

Or in the track composition in which the same time code (absolute time code or user time code) is recorded in the index area of continuous plural tracks in one frame, and the leader code is recorded in the index area for recording the time code, it is possible to rewrite the leader code while preserving the time code. It is very convenient if the leader code can be inserted at an arbitrary position after recording the video signal. For example, if it is possible to inset the leader code after recording at a scene changing position while taping with a camera-recorder or the like, it is very effectively used when searching for a desired scene. In this case, the time code must be preserved. That is, it is a very effective function to edit so as to change only the leader code while preserving the time code.

Figure 7:
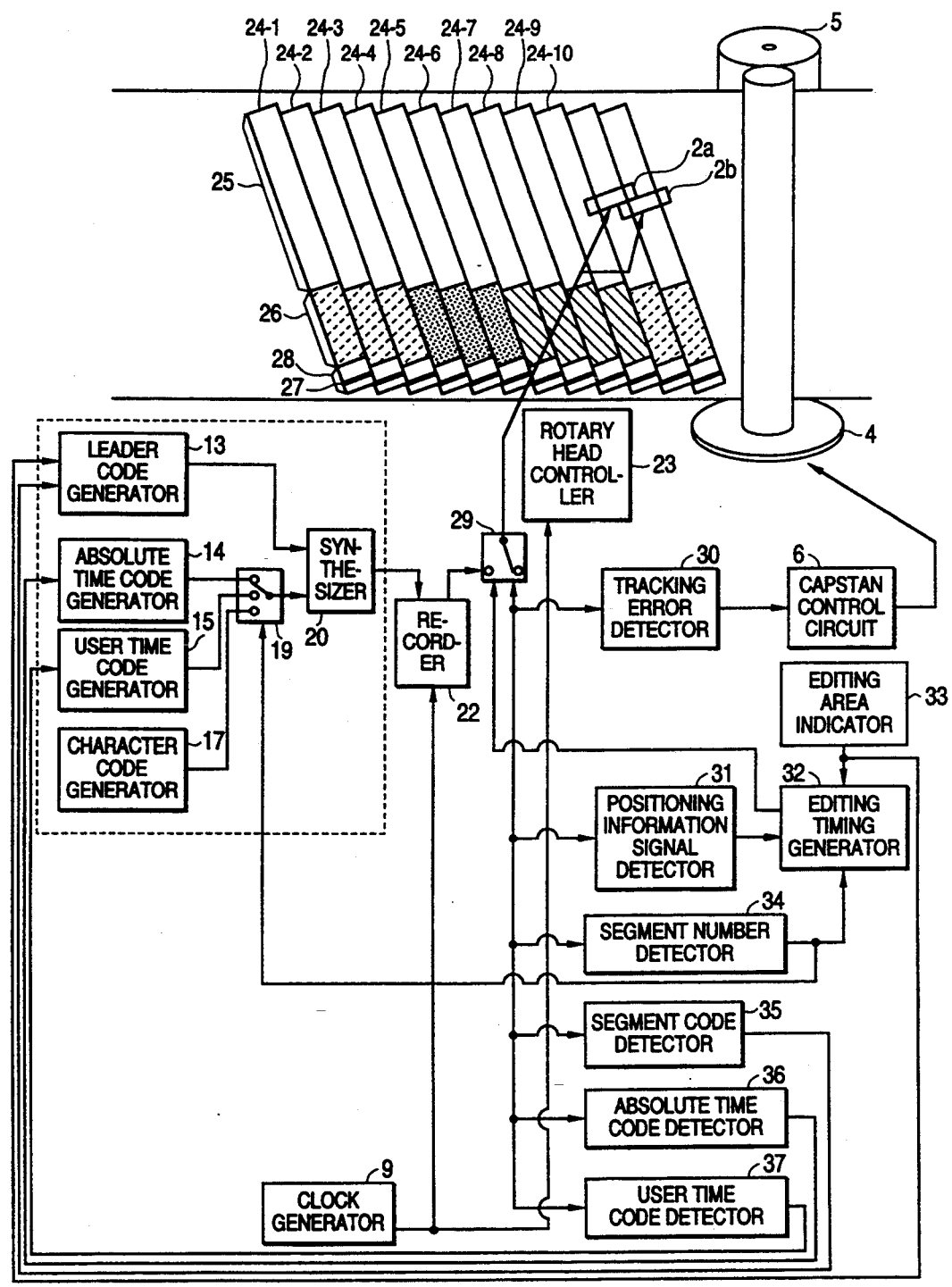
FIG. 7 is a diagram showing an operation in an insert editing mode of a magnetic recording and reproducing apparatus in accordance with the embodiment of the present invention.

The editing operation is explained by reference to FIG. 7. In FIG. 7, element 29 is an editing point changeover switch; element 30 is a tracking error detector; element 31 is a positioning information signal detector; element 32 is an editing timing generator; element 33 is an editing region indicator; element 34 is a segment number detector; element 35 is a leader code detector; element 36 is an absolute time code detector, and element 37 is a user time code detector. A leader code is recorded in the index area where the absolute time code and user time code are recorded, and the case of rewriting the leader code for five seconds (150 frames) is explained below.

When rewriting the leader code in a recording magnetic tape, the mode of running the magnetic tape in the reproducing state is shifted ot the mode of rewiring the leader code from a specific timing. First, the operation common to the two modes is explained. The clock generator 9 generates a signal of 150 Hz, the rotary head controller 23 controls the rotating speed of the cylinder 3 mounting the rotary heads 2a and 2b so as to be synchronized with the clock output of the clock generator 9. As described later, when the rotary heads 2a and 2b scan the tracking signal area 28 of the track, the editing point changeover switch 29 is connected to the terminal 29a to be in the reproducing state for producing the reproduction signal from the rotary head 2a. By this output signal, tracking control is effected.

The tracking method is explained. In the tracking signal region 28 of the track recorded in the above method, pilot signals of two different frequencies f1 and f2 are recorded in every other track in frequency multiplexing. Suppose that signals are recorded sequentially from track 24-1, in the f0 track, f1 track, f0 track, f2 track, f0 track, f1 track, . . . In the f0 tracks, a pilot signal is not recorded. In the f1 track, a pilot signal of frequency f1 is recorded by frequency multiplexing. In the f2 track, a pilot signal of frequency f2 is recorded by frequency multiplexing. Tracking is controlled so that the rotary head 2a always scans the f0 track. For example, in FIG. 7, tracking is effected to scan the track 24-11. When the rotary head 2a scans the tracking signal area 28 of the track 24-11, the leakage components of different pilot signal components f1 and f2 recorded in both adjacent tracks 24-10 and 24-12 are detected inclusively. From the signal, the tracking error information is detected by the tracking error detector 30, and the capstan control circuit 6 controls the capstan motor by the input tracking error information. As the tracking error detector 30, a known detector is used for producing tracking error information proportional to the difference by comparing the magnitude of f1 component and the magnitude of f2 component. The tracking error information is designed to always produce the difference of the pilot signal component contained in the succeeding track from the pilot signal contained in the preceding track. For example, while the rotary head 2a is scanning the track 24-11, the output is the value proportional to the difference between the pilot component contained in the tracking signal area of track 24-10 from the pilot component contained in the tracking signal area of track 24-12. The rotary head 2b is located very close to the rotary head 2a, and its relative position in relation to the rotary head 2a is accurately maintained. Therefore, by tracking the rotary head 2a and track 24-11, the tracking of the rotary head 2b and track 24-12 is achieved at the same time.

Incidentally, during the reproduction state before start of the rewriting of the leader code, the creation of the recording signal is newly started. Its operation is explained below. By tracking in the above method, the reproduction signal from the rotary head 2a is input to the absolute time code detector 36 and the user time code detector 37. In the absolute time code generator 14, the absolute time code increasing the absolute time code detected by the absolute time code detector 36 for one frame is generated, and by increasing successively if no input is made from the absolute time code detector 36, the same code as the previously recorded absolute time code is created. As for the user time code, too, the same code as the previously recorded user time code is created similarly by the user time code detector 37 and user time code generator 15.

Suppose that the leader code is then rewritten by the instruction signal from the editing region indicator 33. In this case, at the timing determined by the method mentioned below, the mode for recording the recording signal generated in the recorded 22 and the mode of reproducing the signal from the rotary heads 2a knit 2b are changed over by the editing point changeover switch 29. That is, when scanning the index area of the track in which the leader code has been recorded, it is the mode for recording the recording signal, and when scanning the other regions, it is the mode for reproducing the signals from the rotary heads 2a and 2b.

First, in the leader code generator 13, a new leader code is created by an instruction signal from the editing region indicator 33.

The time code output unit 19 changes over the signal to be fed to the synthesizer 20 depending on the segment number detected by the segment number detector 34. Here, the segment number detector 34 detects the segment number (the track number in one frame) contained in the video signals in the video signal area 25 by demodulating the reproduction signals from the rotary heads 2a knit 2b. For example, in FIG. 7, the segment number is the segment number of one scan before, and also because of two-channel simultaneous recording, the absolute time code is produced when the detected segment number is 9, 10 or 1, and the user time code when the detected segment number is 2, 3 or 4.

As in the case of recording shown in FIG. 1, the leader code and time code are synthesized in the synthesizer 20, and input to the recorder 22 as the index signal. The recorder 22 sends such recording signal for recording the index signal in the index area to the editing point changeover switch 29, depending on the clock output of the clock generator 9, which is the control reference of the rotary heads 2a and 2b. By such operation, the recording current is created.

The subsequent operation is explained by reference to FIGS. 8 and 9(a)-9(d).

The editing region indicator 33 produces the signal for indicating the rewriting of the leader code. That is, when the segment number is 1, 2, 3, 4, 5 or 6, the signal for instructing the rewriting of the index area is input to the editing timing generator 32. This indication signal is produced for 5 seconds (equivalent to 150 frames).

While the editing point changeover switch 29 is connected to the terminal 29b, the signal from the rotary head 2a is input to the positioning information signal detector 31. The positioning information signal detector 31 detects the positioning information signal recorded in the positioning information signal area 27 in a part of the tracking signal area in the track, and the pulse signal indicating the position of the positioning signal as shown in FIG. 9(b) is generated. This pulse signal is fed in the editing timing generator 32.

The segment number detector 34 detects the segment number (the track number in one frame) contained in the video signals in the video signal area 25 by demodulating the reproduction signal. The detected segment number is input to the editing timing generator 32.

To rewrite the index area of a specific track in one frame, the track (segment) number to be rewritten and the start position and end position n the track must be specified. The editing timing generator 32 generates a timing signal for changing over the connection of the editing point changeover switch 29 to the terminal 29a or terminal 29b, by the output signal of the editing area indicator 33, the output pulse signal of the positioning information signal detector 31, and the output segment number of the segment number detector 34. The operation of the editing timing generator 32 is described in detail below.

The output signal of the editing region indicator 33 and the output signal of the segment number detector 34 are input to a comparative operator 32a of the editing timing generator 32. In the comparative operator 32a, by the output of the segment number detector 34, the track number to be tracked by the next head scanning is detected. If this track number coincides with the track number input from the editing region indicator 33, the comparative operator 32a sets its output Trs to Trs=H, and if there is no coincidence, it sets its output to Trs=L. Here, since the segment number detector 34 detects the segment number contained in the video signal recorded in the video signal area 25, the segment number preserved when the rotary head 2a is scanning the index region 26 or tracking signal region 28 is the segment number of one scan before.

Figure 8:
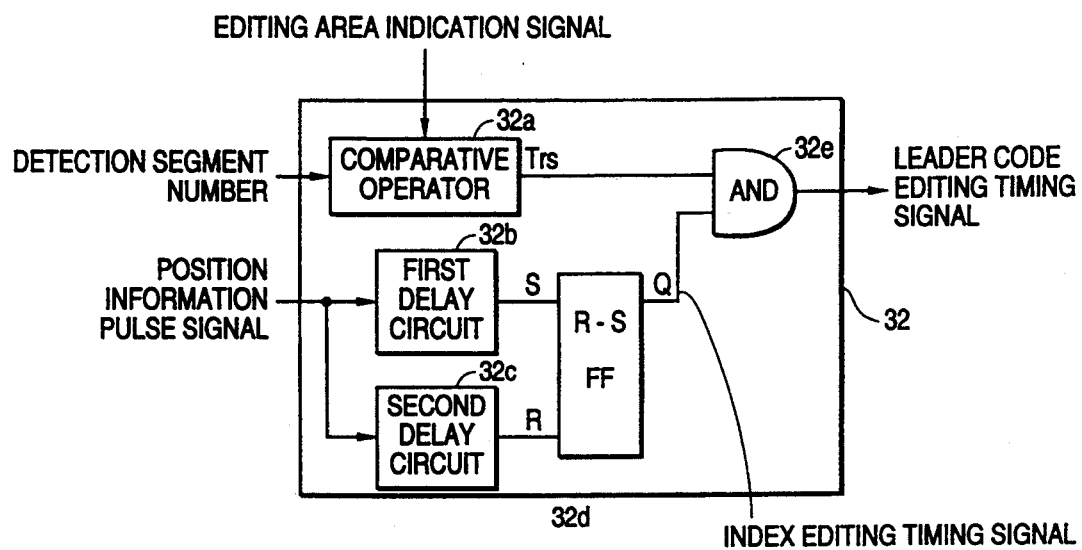
FIG. 8 is an internal detailed diagram of an editing timing generating means in the embodiment of the present invention.
Figure 8:
Figure 8:
Figure 8:
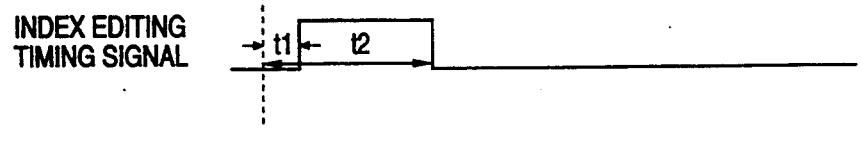
Figure 8:
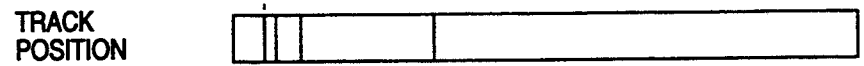

The output pulse signal of the positioning information signal detector 31 is input to a first delay circuit 32b and a second delay circuit 32c. In each delay circuit, starting to count the internal clocks in the magnetic recording and reproducing apparatus shown in FIG. 9(a), the delay signal of each delay circuit is created by counting the internal clocks corresponding to the specified delay time t1 and t2. By inputting these signals to R-S FF (flip-flop) 32d as shown in FIG. 8, the index editing timing signal as shown in FIG. 9(c) is created. This index editing timing signal is input to an AND circuit 32e together with the output Trs of the comparative operator 32a, and the operation result is input to the editing point changeover switch 29 as the leader code editing timing signal.

When the thus composed leader code editing timing signal is at an H level, the editing point changeover switch 29 is changed from terminal 29b to terminal 29a, and a new recording signal is applied to the rotary head 2a, and the index region of the track in which the leader code is recorded is replaced by a new leader code.

The recording current is created in the above method and the timing of the rewriting is determined, and hence the embodiment of the invention realizes an insert editing of rewriting the leader code while preserving the time code (absolute time code and user time code).

Consider the case of only changing the time code while preserving the leader code. For example, if recorded without adding a time code, or when the recorded date is wrong (due to a time difference or an unadjusted internal clock), it is desirable for a correct code to be recorded. In this case, the user time code is changed while preserving the leader code. In this case, what differs from changing of the leader code is, if the desired time code can be created by the user time code generator 15, the method of generating the leader code in the creation of the recording current, and the track umber to be changed is as indicated by the output signal of the editing area indicator 33. Here, the rewriting track number differs from the case of rewriting the leader code, but the principle of operation is the same, and a detailed explanation has been omitted. The output signal of the editing area indicator 33 feeds the output signal into the editing timing generator 32 for instructing the rewriting the index region only when the track number (segment number) is 4, 5 or 6.

The following is an explanation of a method of creating the leader code when rewriting the user time code. When the editing point changeover switch 29 is connected to the terminal 29b and the reproduction signals input from the rotary head 2a, the leader code detector 35 detects the leader code by the reproduction signal from the index area of the track in which the absolute time code is recorded. In the leader code generator 13, the same code as the detected leader code is created. By feeding the created leader code into the synthesizer 20, the recording current is created thereafter in the same manner as above.

When rewriting the absolute time code, the leader code is detected from the index area of the track in which the user time code is recorded, and the leader code detected by the leader code detector 35 is the information of one frame before, but considering the nature of the leading code, there is no problem at all functionally.

As explained herein, by recording together with the leader code in the index area of the track for recording the time code, the time code or leader code can be individually edited. Hence, a magnetic recording and reproducing apparatus having a more advanced editing function can be realized.

The embodiment refers to a case of simultaneous recording in two channels, but the combination of the rotary head and layout are not limited to this embodiment alone, but may be similarly applied also to other cases.

In the foregoing embodiment, the case of creating video signals of 30 frames per second is shown, but this number of frames is not limitative. Likewise, in the embodiment, the video signals of one frame are divided into ten segments and recorded in ten tracks, but the number of segments to be divided is not limitative.

The embodiment relates to the apparatus for recording video signals, but, needless to say, the invention also include the apparatus for recording video signals together with audio signals.

The pilot signal for tracking in the embodiment is shown as being of two types, but pilot signals of four types of frequencies as used on an 8 mm VCR may be also used. Moreover, it is salsa possible to record only one type of pilot signal by varying the recording position of the pilot signal as in the DAT. The method of feeding the pilot signal may not be specified.

The embodiment shows the tracking control by using the pilot signal multiplexed in frequency in the beginning tracking signal area of the track, but only the positioning information signal in editing may be recorded in the tracking signal area, and the tracking control may be realized by controlling using the control signal recorded in the linear track at the end of the tape as employed in the conventional VHS VCR.

What is claimed is:

1. A magnetic recording apparatus for recording video signals and index signals on oblique tracks each having a video signal recording area and an index area on a magnetic tape, comprising:
   a means for moving the magnetic tape;
   a video signal generating means for generating a video signal;
   a clock signal generating means for generating a clock signal synchronized with the video signal;
   a segmenting means for dividing the video signal in each frame into a plurality of segments to obtain segmented video signals;
   an index signal generating means for generating index signals containing a user time code; and
   a recording means including a rotary magnetic head, said recording means being responsive to the clock signal for alternately selecting and recording via the rotary magnetic head the segmented video signals and the index signals such that the segmented video signals in each frame and the index signals are recorded in video signal recording areas and index areas, respectively, of each of a set of continuous oblique tracks;
   wherein said index signal generating means generates a same user time code repeatedly so that the same user time code is recorded in the index signal recording area of each of at least three continuous adjacent oblique tracks selected from among the set of continuous oblique tracks and so that index signal recording area of at least one oblique track selected from among the set of continuous oblique tracks fails to have a user time code recorded therein.

2. An apparatus according to claim 1, wherein the index area of each oblique track has a plurality of small areas, and wherein said index signal generating means generates the same user time code repeatedly so that the same time coded is recorded in each of the plurality of small areas in the index area having the same user time code recorded therein.

3. An apparatus according to claim 1, wherein the index signal generating means includes a means for generating a leader code, and a synthesizing means for synthesizing the time code and the leader code, and wherein the index signal generating means generates as the index signal a signal containing an output signal of the synthesizing means so that the leader code is recorded in the index area of each of said at least three adjacent continuous oblique tracks having the same user time code recorded therein.

4. A magnetic recording apparatus for recording video signals and index signals on oblique tracks each having a video signal recording area and an index area on a magnetic tape, comprising:
   a means for moving the magnetic tape;
   a video signal generating means for generating a video signal;
   a clock signal generating means for generating a clock signal synchronized with the video signal;
   a segmenting means for dividing the video signal in each frame into a plurality of segments to obtain segmented video signals;
   an index signal generating means for generating index signals containing an absolute time code indicating a position on the magnetic tape and a user time code set by a user; and
   a recording means including a rotary magnetic head, said recording means being responsive to the clock signal for alternately selecting and recording via the rotary magnetic head the segmented video signals and the index signal such that the segmented video signals in each frame and the index signals are recorded in video signal recording areas and index areas, respectively, of a set of continuous oblique tracks;

wherein said index signal generating means generates a same absolute time code repeatedly so that the same absolute time code is recorded in the index signal recording area of each of at least three continuous adjacent oblique tracks selected from among the set of continuous oblique tracks, and generates a same user time code repeatedly so that the same user time code is recorded in the index signal recording area of each of at least three continuous adjacent oblique tracks among the same set of continuous oblique tracks and so that the index signal recording area of at least one oblique track selected from among the set of continuous oblique tracks fails to have a user time code recorded therein.

5. An apparatus according to claim 4, wherein the index area of each oblique track has a plurality of small areas, and wherein said index signal generating means generates the same absolute time code repeatedly so that the same absolute time coded is recorded in each of the plurality of small areas in the index area of each of said at least three continuous adjacent oblique tracks having the same absolute time code recorded therein.

6. An apparatus according to claim 4, wherein the index signal generating means includes a means for generating a leader code, and a synthesizing means for synthesizing the absolute time code and the leader code and for synthesizing the user time code and the leader code, and wherein the index signal generating means generates as the index signal a signal containing an output signal of the synthesizing means so that the leader code is recorded in the index area of each of said at least three continuous adjacent oblique tracks having the same absolute time code recorded therein.

* * * * *